US009304767B2

(12) United States Patent
Olson et al.

(10) Patent No.: US 9,304,767 B2
(45) Date of Patent: Apr. 5, 2016

(54) SINGLE CYCLE DATA MOVEMENT BETWEEN GENERAL PURPOSE AND FLOATING-POINT REGISTERS

(75) Inventors: Christopher Olson, Austin, TX (US); Robert T. Golla, Round Rock, TX (US); Jeffrey S. Brooks, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 1608 days.

(21) Appl. No.: 12/476,636

(22) Filed: Jun. 2, 2009

(65) Prior Publication Data

US 2010/0306510 A1 Dec. 2, 2010

(51) Int. Cl.
 *G06F 9/30* (2006.01)
 *G06F 15/00* (2006.01)
 *G06F 9/38* (2006.01)

(52) U.S. Cl.
 CPC .......... *G06F 9/30032* (2013.01); *G06F 9/3013* (2013.01); *G06F 9/30014* (2013.01); *G06F 9/384* (2013.01); *G06F 9/3851* (2013.01); *G06F 9/3885* (2013.01)

(58) Field of Classification Search
 None
 See application file for complete search history.

(56) References Cited

U.S. PATENT DOCUMENTS

| | | | | |
|---|---|---|---|---|
| 5,450,607 | A | * | 9/1995 | Kowalczyk et al. ............ 712/41 |
| 5,778,248 | A | | 7/1998 | Leung |
| 5,805,486 | A | * | 9/1998 | Sharangpani ................ 708/524 |
| 6,249,798 | B1 | * | 6/2001 | Golliver et al. ............... 708/490 |
| 6,405,306 | B2 | * | 6/2002 | Elliott et al. ................. 712/222 |
| 6,757,807 | B1 | | 6/2004 | Jacobson et al. |
| 7,216,216 | B1 | | 5/2007 | Olson et al. |
| 7,437,538 | B1 | | 10/2008 | Brooks et al. |
| 2006/0265575 | A1 | | 11/2006 | Damron |
| 2010/0250639 | A1 | | 9/2010 | Olson et al. |

OTHER PUBLICATIONS

"Register file" from Wikipedia, the free encyclopedia, http://en.wikipedia.org/wiki/Register_file last modified on Mar. 2, 2009.
"Instruction cycle" from Wikipedia, the free encyclopedia, http://en.wikipedia.org/wiki/Instruction_cycle, last modified on Mar. 30, 2009, retrieved on Mar. 31, 2009.
"Reduced instruction set computer" from Wikipedia, the free encyclopedia, http://en.wikipedia.org/wiki/Reduced_instruction_set_computer retrieved on Mar. 31, 2009.
Section 2, Overview, The SPARC Architecture Manual: Version 8, pp. 9-14, Copyright 1991, 1992, printed in the USA.

(Continued)

*Primary Examiner* — Corey S Faherty
(74) *Attorney, Agent, or Firm* — Marsh Fischmann & Breyfogle LLP; Jonathon A. Szumny

(57) ABSTRACT

Systems and methods for providing single cycle movement of data between a floating-point register file (FRF) and a general purpose or integer register file (IRF) of a microprocessor system are provided. The system may include an integer execution unit operative to execute instructions with single cycle latency, a floating-point execution unit, a working register file (WRF), an FRF, and an IRF. To achieve the single cycle movement functionality, the integer execution unit may physically own the WRF, IRF, and FRF, and may monitor and control any dependencies between them. Thus, since the integer execution unit has direct read access to both the IRF and the FRF, data may be moved between the two register files using the single cycle operation of the integer execution unit, without the need to store and load the data from memory.

20 Claims, 7 Drawing Sheets

(56) References Cited

OTHER PUBLICATIONS

SPARC, from Wikipedia, the free encyclopedia, retrieved from "http://en.wikipedia.org/wiki/SPARC" last modified on Mar. 30, 2009, retrieved on Mar. 31, 2009.

"Processor register" from Wikipedia, the free encyclopedia, retrieved from "http://en.wikipedia, org/wiki/ Processor_register" last modified on 29 Mar. 29, retrieved on Mar. 31, 2009.

"Register window" from Wikipedia, the free encyclopedia, retrieved from "http://en.wikipedia.org/wiki/Register_window" last modified on Jan. 14, 2009, retrieved on Mar. 31, 2009.

* cited by examiner

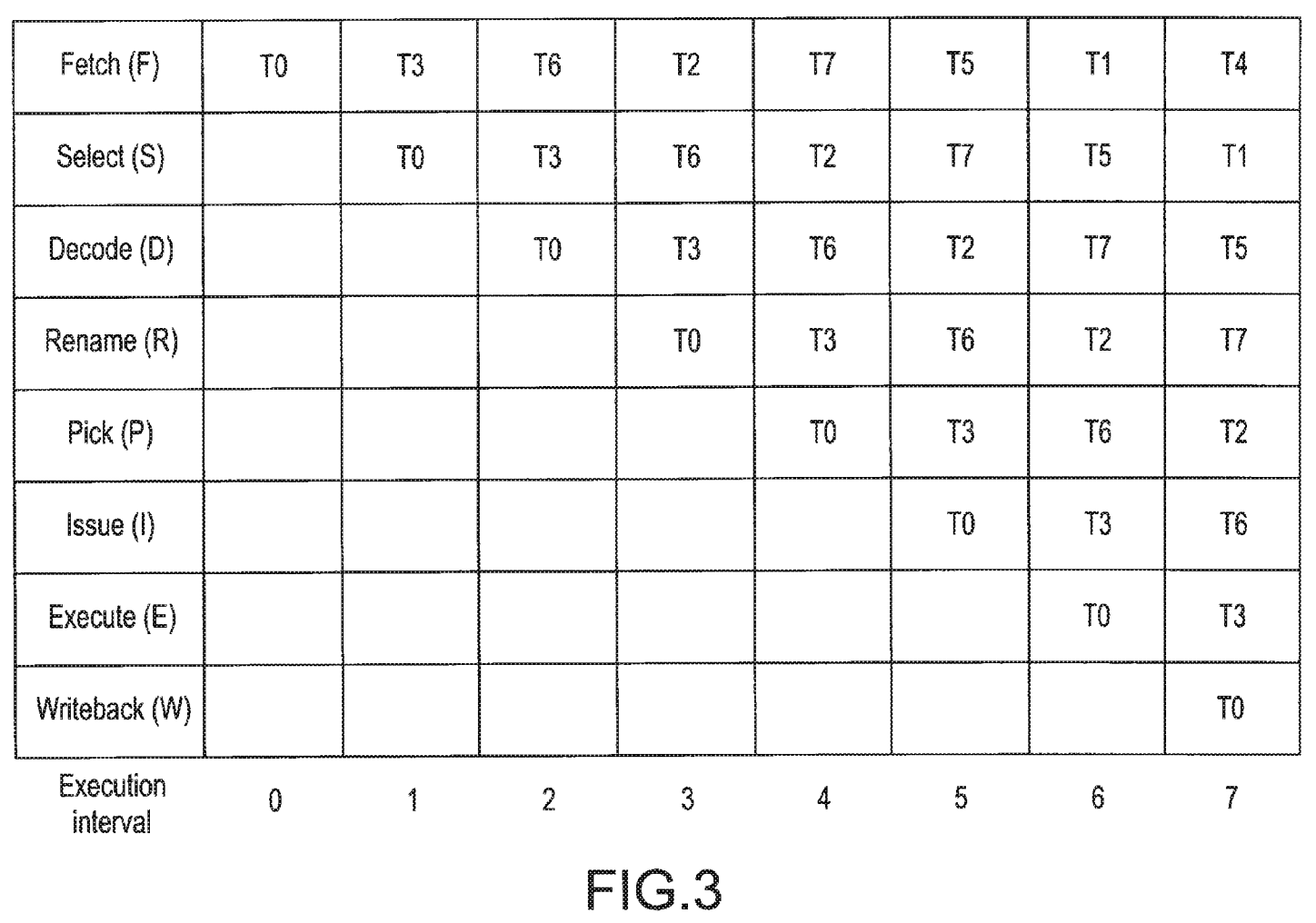

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Select (S) | | T0 | T3 | T6 | T2 | T7 | T5 | T1 |
| Decode (D) | | | T0 | T3 | T6 | T2 | T7 | T5 |
| Rename (R) | | | | T0 | T3 | T6 | T2 | T7 |
| Pick (P) | | | | | T0 | T3 | T6 | T2 |
| Issue (I) | | | | | | T0 | T3 | T6 |
| Execute (E) | | | | | | | T0 | T3 |
| Writeback (W) | | | | | | | | T0 |
| Execution interval | | | | | | | | |

FIG.3

(12) United States Patent

US 9,304,767 B2

SINGLE CYCLE DATA MOVEMENT BETWEEN GENERAL PURPOSE AND FLOATING-POINT REGISTERS

BACKGROUND OF THE INVENTION

The use of integer and floating-point units within a microprocessor is widely used in the computer industry. Generally, the integer unit may provide basic arithmetic and logical operations for the microprocessor, while the floating-point unit provides similar functionality in floating-point format when floating-point operations are to be performed. Additionally, there may be two sets of registers (register files), a floating-point register file (FRF) for the floating-point unit and a general purpose or integer register file (IRF) for the integer unit. Each of the registers in the register files may be a certain bit length (e.g., 32 bits, 64 bits, or the like), and each register file may include any suitable number of registers, such as 8 registers, 16 registers, 32 registers, or the like.

In current microprocessor technology, an integer unit may include an IRF for storing information and one or more execution units for performing operations on the information based on instructions conveyed to the execution units (e.g., through program code). In addition to the one or more execution units, the IRF may also be coupled to one or more buses for the transfer of information to other units, such as memory. In this regard, data may be loaded from memory to the IRF, and then may be operated on by the execution unit, and the result may be returned to the IRF and/or stored back in memory.

The floating-point unit may be configured similarly to the integer unit in that it includes a register file (FRF) that may be coupled to one or more units, such as memory. Further, the floating-point unit may include one or more floating-point execution units that operate based on floating-point instructions. Advantageously, the floating-point unit may provide support for complex numerical and scientific calculations on data that is in floating-point format.

In some instances, it may be desirable to move data between a register of the IRF and a register of the FRF. Generally, processors may perform this function by executing load and store instructions, which operate to move data from a first register file (e.g., an IRF) to memory, and then from memory to a second register file (e.g., an FRF). As can be appreciated, performing load and store memory instructions may undesirably require several cycles of latency, which may reduce the performance of the microprocessor and/or program code executing on the microprocessor.

SUMMARY OF THE INVENTION

The embodiments disclosed herein provide methods and systems for moving data between an integer register file (IRF) and a floating-point register file (FRF) of a processor with single cycle latency. In this regard, the need to load and store data to memory in order to move data between an IRF and an FRF is eliminated. Various features and embodiments of the present invention are described in detail below.

According to a first aspect, a processor that includes an integer unit and a floating point execution unit is provided. The integer unit includes an integer execution unit that is operative to execute an instruction with single cycle latency. The integer unit also includes an integer register file (IF) coupled to the integer execution unit, and a floating-point register file (FRF) also coupled to the integer execution unit. The floating-point execution unit is operative to execute one or more types of instructions with multiple cycle latency. The processor further includes a data bus that couples the floating-point execution unit to the integer unit. Further, the integer unit is operative to move data between a register of the IRF and a register of the FRF with single cycle latency using the integer execution unit.

According to a second aspect, a method of fabricating a core adapted for providing functionality to move data between register files in a processor that includes an integer execution unit and a floating-point execution unit is provided. The method includes providing an integer unit that includes an integer execution unit that is operative to execute one or more types of instructions with single cycle latency. The method further includes positioning an integer register file (IRF) proximate to the integer execution unit inside the integer unit, and positioning a floating-point register file (FRF) proximate to the integer execution unit inside the integer unit. In addition, the method includes moving data between a register of the IRF and a register of the FRF with single cycle latency using the integer execution unit.

According to a third aspect, a computer implemented method for moving data between register files of a processor is provided. The processor includes an integer unit that includes an integer execution unit that is operative to execute one or more types of instructions with single cycle latency. The integer unit includes an integer register file (IRF) coupled to the integer execution unit, and a floating-point register file (FRF) coupled to the integer execution unit. The processor also includes a floating-point execution unit that is operative to execute one or more types of instructions with multiple cycle latency. The processor further includes a data bus that couples the floating-point execution unit to the integer unit. The computer implemented method includes moving the data of a source register to a destination register by executing program code on the processor, the source register being a register in one of the IRF and the FRF, and the destination register being a register in another one of the IRF and the FRF. The method also includes performing the moving of the data using the integer execution unit of the integer unit with single cycle latency.

In addition to the exemplary aspects and embodiments described above, further aspects and embodiments will become apparent by reference to the drawings and by study of the following descriptions.

BRIEF DESCRIPTION OF THE DRAWINGS

FIG. 3 is a pipeline diagram illustrating one embodiment of a pipeline that may be implemented by the core shown in FIGS. 1 and 2.

DETAILED DESCRIPTION

Figure 1:
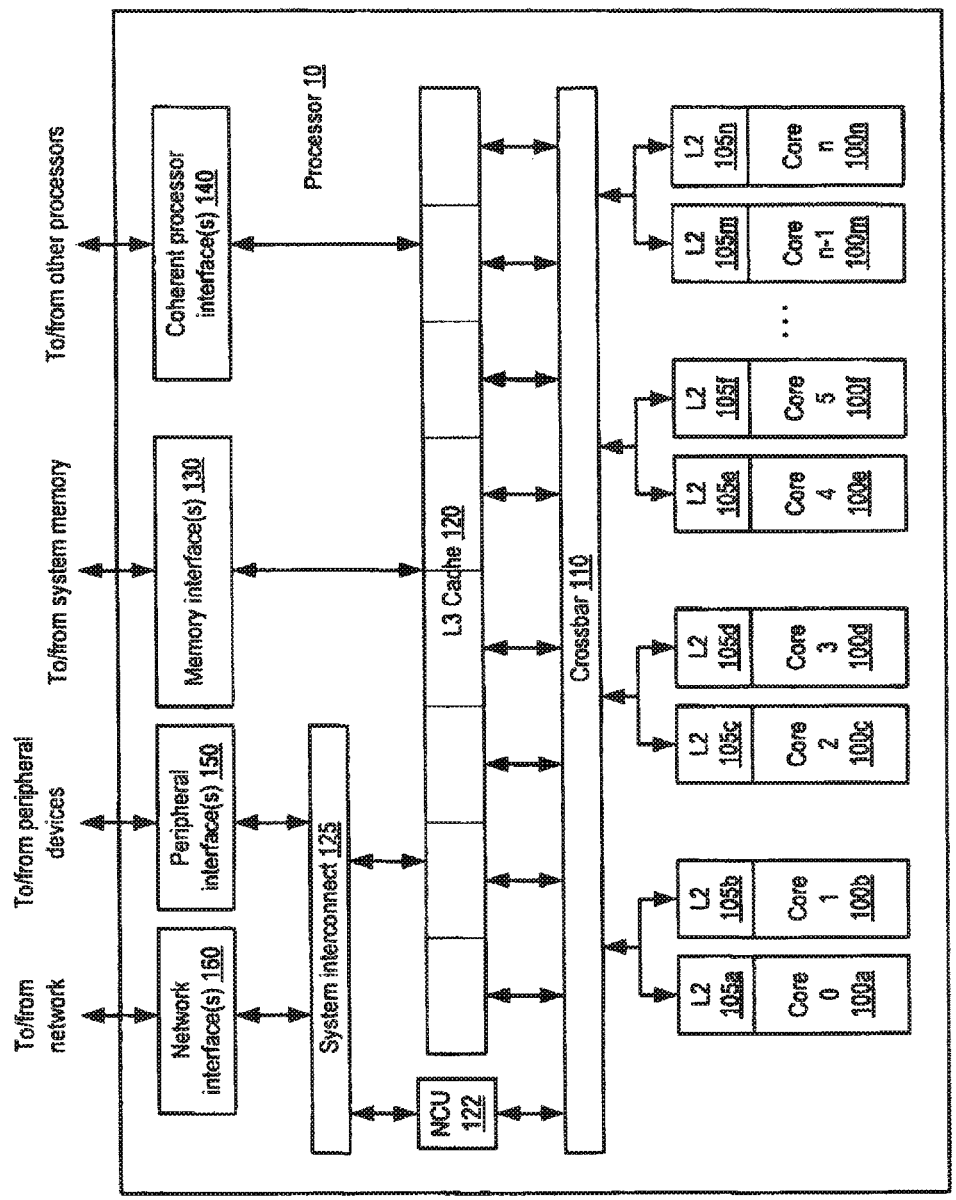
FIG. 1 is a block diagram illustrating one embodiment of a multithreaded processor.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

In the following discussion, systems and methods for providing single cycle movement of data between a floating-point register file (FRF) and a general purpose or integer register file (IRF) are explored. First, with reference to FIGS. 1-3, an overview is provided of one type of multithreaded processor in which the single cycle data movement may be implemented. Next, with reference to FIGS. 4-6, particular embodiments of systems and methods for providing single cycle data movement are discussed. Finally, with reference to FIG. 7, an exemplary system embodiment including a processor that may implement the systems and methods described herein is discussed.

A block diagram illustrating one embodiment of a multithreaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the description of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configurations are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (e.g., capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

To provide an overview of dynamic multithreading processor core, as mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
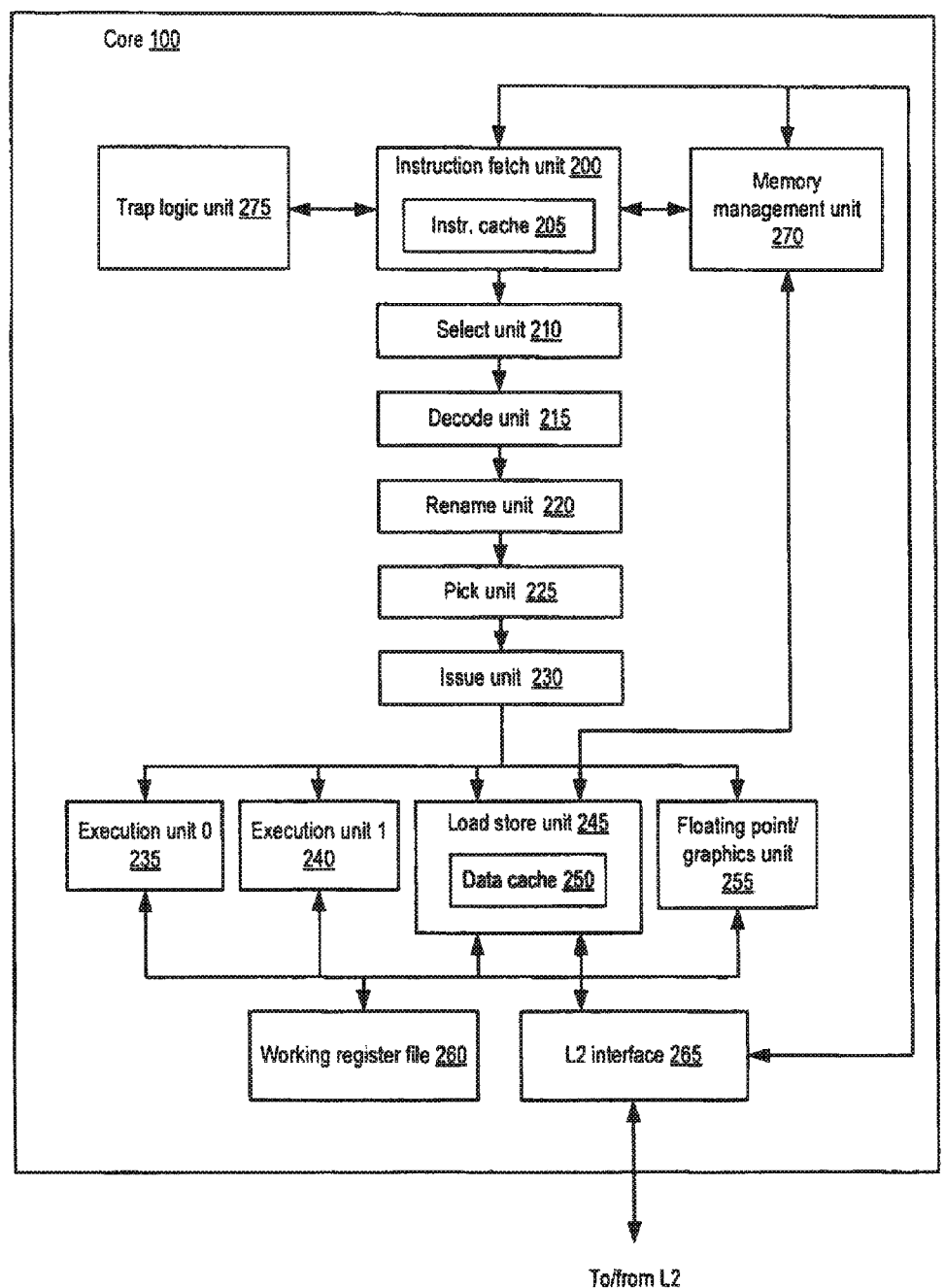
FIG. 2 is a block diagram illustrating one embodiment of a processor core configured to perform fine-grained multithreading.

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FPU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (e.g., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating-point-graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (e.g., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FPU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (e.g., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FPU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments, execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units 235-240, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses; In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating-point/graphics unit 255 may be configured to execute and provide results for certain floating-point and graphics-oriented instructions defined in the implemented ISA. For example, in one embodiment FPU 255 may implement single- and double-precision floating-point arithmetic instructions compliant with the IEEE 754-1985 floating-point standard, such as add, subtract, multiply, divide, and certain transcendental functions. Also, in one embodiment FPU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FPU 255 may implement fused and unfused floating-point multiply-add instructions. Additionally, in one embodiment FPU 255 may implement certain integer instructions such as integer multiply, divide, and population count instructions. Depending on the implementation of FPU 255, some instructions (e.g., some transcendental or extended-precision instructions) or instruction operand or result scenarios (e.g., certain denormal operands or expected results) may be trapped and handled or emulated by software.

In one embodiment, FPU 255 may implement separate execution pipelines for floating-point add/multiply, divide/square root, and graphics operations, while in other embodiments the instructions implemented by FPU 255 may be differently partitioned. In various embodiments, instructions implemented by FPU 255 may be fully pipelined (e.g., FPU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FPU 255 may also be configured to implement hardware cryptographic support. For example, FPU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FPU 255 may also include logic to implement hash or checksum algorithms such as Secure Hash Algorithm (SHA-1, SHA-256, SHA-384, SHA-512), or Message Digest (MD5). FPU 255 may also be configured to implement modular arithmetic such as modular multiplication, reduction and exponentiation, as well as various types of Galois field operations. In one embodiment, FPU 255 may be configured to utilize the floating-point multiplier array for modular multiplication. In various embodiments, FPU 255 may implement several of the aforementioned algorithms as well as other algorithms not specifically described.

The various cryptographic and modular arithmetic operations provided by FPU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. Such a traversal may also be referred to as a page table walk or a hardware table walk. In some embodiments, if MMU 270 is unable to derive a valid address translation, for example if one of the memory pages including a necessary page table is not resident in physical memory (e.g., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requesters. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (e.g., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FPU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Select (S), Decode (D), Rename (R), Pick (P), Issue (I), Execute (E), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The Fetch stage of the illustrated integer pipeline may generally correspond to the functioning of IFU 200. In one embodiment, during the Fetch stage, one or more threads to fetch may be selected, and instruction cache 205 may be accessed for the selected thread. Additionally, fetch unit 200 may determine whether the access of the previous cycle hit or missed the cache. If the access hit, the instructions read from the cache may be stored in instruction buffers. During the Select stage, select unit 210 may be configured in one embodiment to select at most two instructions to issue, one for each thread group as described above. Source dependencies of the selected instructions on previously issued instructions may also be detected during the Select stage.

During the Decode stage, decode unit 215 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Rename stage, rename unit 220 may be configured to rename the logical (e.g., architected) destination registers specified by instructions by mapping them to a physical register space, resolving false dependencies in the process. In some embodiments, rename unit 220 may maintain mapping tables that reflect the relationship between logical registers and the physical registers to which they are mapped.

During the Pick stage, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

During the Issue stage, issue unit 230 may be configured to provide instruction sources and data to the various execution units for picked instructions. In one embodiment, issue unit 230 may be configured to read source operands from the appropriate source, which may vary depending upon the state of the pipeline.

During the Execute stage, one or both of execution units 235, 240 may be active to compute an instruction result. Next, during the Writeback stage, the instruction result may be written back to the working register file 260 (WRF). In addition to writing the result to the WRF, the instruction results may be bypassed (or forwarded) to other instructions that are dependent upon the instruction results. As an example, bypass circuits may be provided that are operative to detect these dependency conditions and to arbitrate access to the instruction results. In this regard, dependent instructions may be executed by the execution units 235, 240 without having to wait for the instruction results to be written to the WRF 260.

In the illustrated embodiment, with reference to FIG. 3, integer instructions are depicted as executing back-to-back in the pipeline without stalls. In execution intervals 0 through 7, instructions from threads T0, T3, T6, T2, T7, T5, T1 and T4 enter the Fetch stage, respectively, though in other embodiments, instructions may issue from various threads in a different order according to the operation of select unit 210. In some instances, other instructions issued prior to execution interval 0 may also be in the pipeline. Additionally, in some embodiments, two different instructions from the same or different threads may execute during the same pipeline stage. For example, in the illustrated embodiment of core 100, one integer instruction may be issued to each of execution units 235, 240 in a single cycle.

By execution interval 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Figure 4:
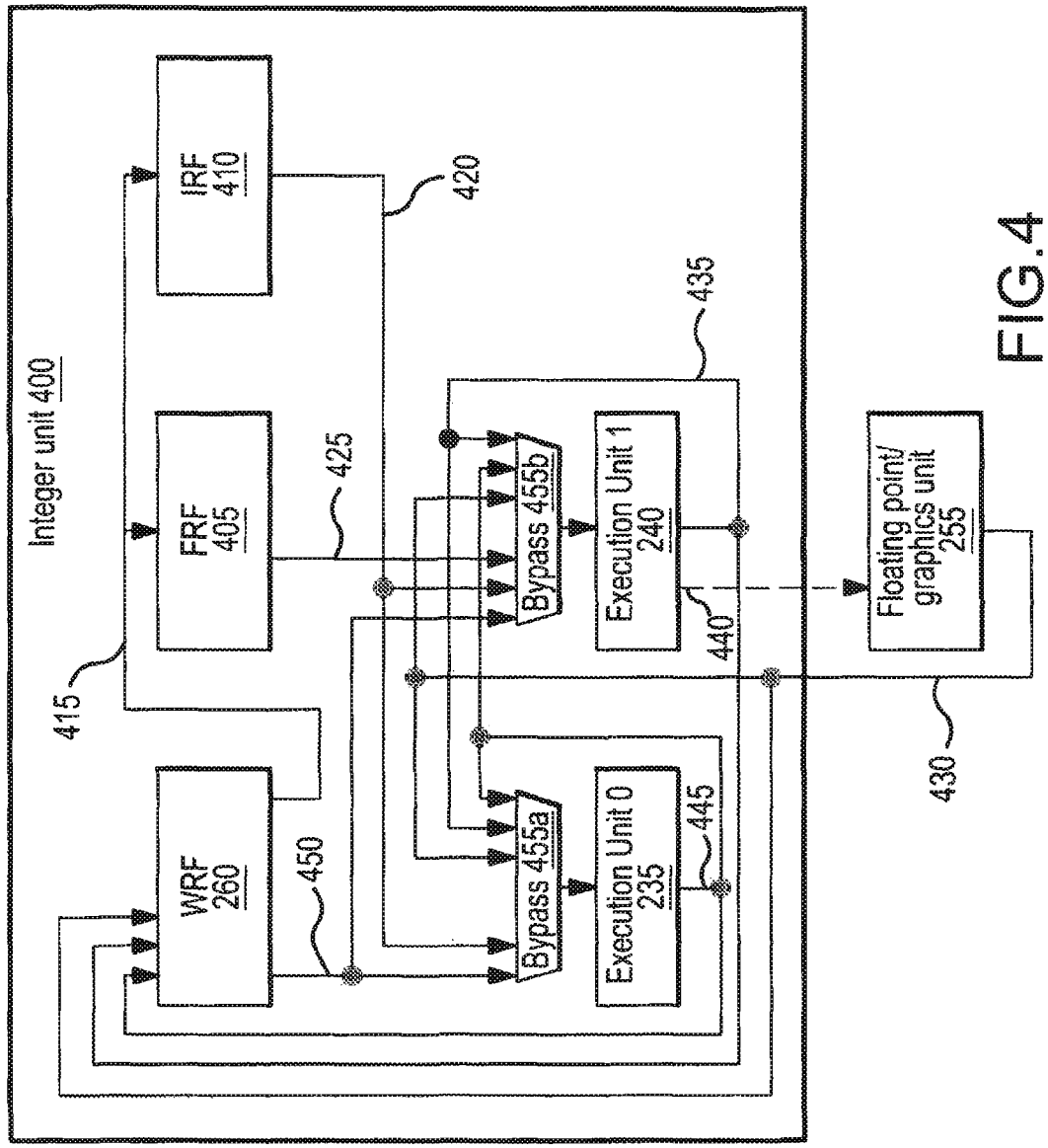
FIG. 4 is a block diagram illustrating one embodiment of an integer unit and a floating point unit.

FIG. 4 is a block diagram illustrating one embodiment of an integer unit 400 and the floating point/graphics unit (FPU) 255. Integer unit 400 includes the working register file (WRF) 260 shown in FIG. 2, a floating point register file (FRF) 405, and an integer register file (IRF) 410. Integer unit 400 also includes the two execution units EXU0 235 and EXU1 240 shown in FIG. 2. These components are coupled together with data buses 415, 420, 425, 430, 435, 440, 445, and 450 that are used to move data between the various components. As shown in FIG. 4, separate register files are provided for integer unit 400 (e.g., the IRF 410) and FPU 255 (e.g., the FRF 405).

Similar to the embodiment described above, issued instructions may proceed to one or more of the illustrated execution units 235, 240, or 255 for execution. In one embodiment, EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculations for load/store instructions executed by LSU 245 shown in FIG. 2. EXU1 240 may be configured to execute integer instructions issued from slot 1, as well as branch instructions. In this embodiment, FPU 255 instructions and multicycle integer instructions may be processed as slot 1 instructions that pass through the EXU1 240 pipeline, although some of these instructions may actually execute in other functional units.

In this embodiment, the WRF 260 and IRF 410 may be physically implemented within or near execution units 235, 240, for example, within the integer unit 400. In this regard, EXU0 235 and EXU1 240 may be operative to perform various instructions with single cycle latency. As can be appreciated, placing the WRF 260 proximate to EXU0 235 and EXU1 240 reduces the length of the wires (or buses) that connect the WRF 260 to EXU0 235 and EXU1 240, and therefore reduces the amount of time required to send data between the WRF 260 and the execution units 235, 240. As noted above, the WRF 260 may be used to temporarily store results data from the execution units 235, 240, and 255 that have not yet been committed (e.g., not yet been written to the IRF 410 or the FRF 405).

In addition, since the WRF 260 is physically implemented within integer unit 400, the FRF 405 may also be implemented physically within the integer unit 400 to minimize the length of the data bus 415 and facilitate sharing of bypass logic. As an example, the WRF 260, the IRF 410, and the FRF 405 may all be implemented physically within integer unit 400. It should be appreciated that the location of the FRF 405, WRF 260, and IRF 410 may be positioned proximate to EXU0 235 and EXU0 240 such that they may perform operations on data stored in those register files with single cycle latency.

To provide the functionality to process instructions with single cycle latency, various data buses and bypass logic (e.g., bypass controllers 455a-b) may be provided. More specifically, write ports of the WRF 260 may be coupled to a data results bus 445 for EXU0 235, to a data results bus 435 for EXU1 240, and to a data results bus 430 for FPU 255. In this regard, results data from the execution units 235, 240, and 255 may be written directly to the WRF 260 where they may be temporarily stored. EXU0 235 and EXU1 240 may also be coupled to a read port of the WRF 260 via the data bus 450 so that they may utilize data stored in the WRF 260 that has not yet been committed. Further, the data bus 415 may operate to couple a read port of the WRF 260 to the write ports of the FRF 405 and the IRF 410 so that data temporarily stored in the WRF 260 may be written to the FRF 405 and the IRF 410 (e.g., when the results data is committed by the TLU 275 shown in FIG. 2).

EXU0 235 and EXU1 240 may be coupled to a read port of the IRF 410 through the data bus 420. Further, EXU1 240 may be coupled to a read port of the FRF 405 through a data bus 425. As noted above, in this embodiment, floating point instructions that execute on FPU 255 may pass through EXU1 240 pipeline to the FPU 255 via the data bus 440. It should be appreciated that it is contemplated that in other embodiments EXU0 235 may also be able to read from the FRF 405 as well. As can be seen in FIG. 4, the various components are coupled together via data buses in such a manner as to reduce the cycle latency for executing instructions. For example, if a source operand depends on a prior instruction that is still in an execution pipeline, the operand may be bypassed directly using bypass logic (e.g., bypass controllers 455a-b) from the appropriate execution unit result bus. Results may also be sourced from the WRF 260, the IRF 410, and the FRF 405 by utilizing the data buses 450, 420, and 425, respectively. It will be appreciated that the bypass logic, such as the bypass controllers 455a-b, may be of any suitable configuration, and may be operative to resolve data dependencies and to bypass (or forward) results data to execution units that may be dependent on the data, such that instructions may be executed with single cycle latency.

By implementing the FRF 405 and the IRF 410 physically near EXU0 235 and EXU1 240 (e.g., within integer unit 400) and coupling the FRF 405 to EXU1 240, it is possible to utilize EXU0 235 and/or EXU1 240 to move data between the FRF 405 and the IRF 410 with single cycle latency. For example, a move instruction may be executed by EXU1 240 to move data from a register of the FRF 405 to a register of the IRF 410. In operation, data from the FRF 405 may be provided to EXU1 240 via the data bus 425. Then, EXU1 240 may execute the move instruction with single cycle latency and place the results data on the results data bus 435, where it may then be written to the WRF 260 and eventually the IRF 410, thereby completing the move instruction. As can be appreciated, bypass logic and data buses may operate to make the results data from the move instruction immediately available for other instructions to use, such that single cycle latency may be achieved.

Similarly, EXU0 235 or EXU1 240 may be used to implement a single cycle move instruction that operates to move data from the IRF 410 to the FRF 405. In operation, data from the IRF 410 may be provided to EXU0 235 (or EXU1 240) via the data bus 420. Then, EXU0 235 may execute the move instruction with single cycle latency and place the results data on the data bus 445, where it may then be eventually written to the FRF 405 using a similar procedure to that described above in relation to the FRF-to-IRF move instruction.

As can be appreciated, an ISA may include specific instructions (or opcodes) to perform these FRF-to-IRF and IRF-to-FRF move instructions. As an example, the UltraSPARC Architecture 2009 may include unique opcodes to move data from a register in the FRF 405 to a register in the IRF 410. A first instruction (MOVsTOsw) may copy 32 bits from a register in the FRF 405 to the lower 32 bits of a 64 bit register in the IRF 410. Further, the first instruction may sign-extend a sign bit by copying the sign bit into the upper 32 bits of the register in the IRF 410. A second instruction (MOVsTOuw) may copy 32 bits from a register in the FRF 405 to the lower 32 bits of a 64 bit register in the IRF 410 without sign-extending the result. That is, the second instruction may write a zero to the upper 32 bits of the destination register in the IRF 410. A third instruction (MOVdTOx) may copy 64 bits from a register in the FRF 405 to 64 bits in a register of the IRF 410 (e.g., with no conversion). A fourth instruction (MOVwTOs) may copy the lower 32 bits from a register in the IRF 410 to a register in the FRF 405 (e.g., with no conversion). Finally, a fifth instruction (MOVxTOd) may copy 64 bits from a register in the IRF 410 to a register in the FRF 405 with no conversion.

In one embodiment, the MOVdTOx and MOVxTOd instructions may be implemented within the integer unit 400 with single cycle latency, while the remaining IRF/FRF move instructions are executed in the FPU 255. In other embodiments, all of the IRF/FRF move instructions may be implemented with single cycle latency within the integer unit 400. For the MOVxTOd instruction, the integer source operand may be treated like any move (e.g., treated like a move between two registers in the IRF 410), and copied to the single cycle result. This result may then be bypassed using the bypass controllers 455*a-b* to dependent operations and also written to the WRF 260. Once the MOVxTOd result is available, all subsequent code will interpret the result as a floating point value even though it may have been produced by one of the integer execution units 235, 240. For the MOVdTOx instruction, the floating point operand may be treated the same as an integer move instruction, and copied to the single result. The result may be bypassed using the bypass controllers 455*a-b* to dependent integer operations and also written to the WRF 260. Again, once the result is available, subsequent operations will interpret the data as an integer value, so the result may be used by the subsequent operations without any additional latency.

It should be appreciated that the ability to move data between the IRF 410 and the FRF 405 with single cycle latency may have several advantages. As an example, program code that executes primarily floating-point instructions or primarily integer instructions may allocate integer or floating-point data to the IRF 410 and the FRF 405 in such a way that increases the number of registers available, thereby reducing the number of time-intensive memory accesses required to execute the instructions. For example, program code that includes primarily floating-point instructions may allocate a portion of the IRF 410 to store floating-point data, thereby increasing the total number of registers that may be used to execute the program code. As can be appreciated, using these features, the total number of registers required may be reduced, since programs may "borrow" registers from the IRF 410 to store floating-point data or borrow registers from the FRF 405 to store integer data.

It should be appreciated that in previous designs that implemented an IRF proximate to the integer execution unit and an FRF proximate to the FPU (rather than both the IRF and FRF proximate to the integer execution unit), it may have been undesirable or inefficient to move data between the IRF and the FRF. Typically, this operation required either (a) that the data first be stored to memory and then loaded into a register, which was a relatively time-intensive operation, or (b) if the ISA included specific instructions to perform FRF-to-IRF and IRF-to-FRF move instructions, that the data being moved must proceed through the multiple cycle pipeline of the FPU.

Figure 5:
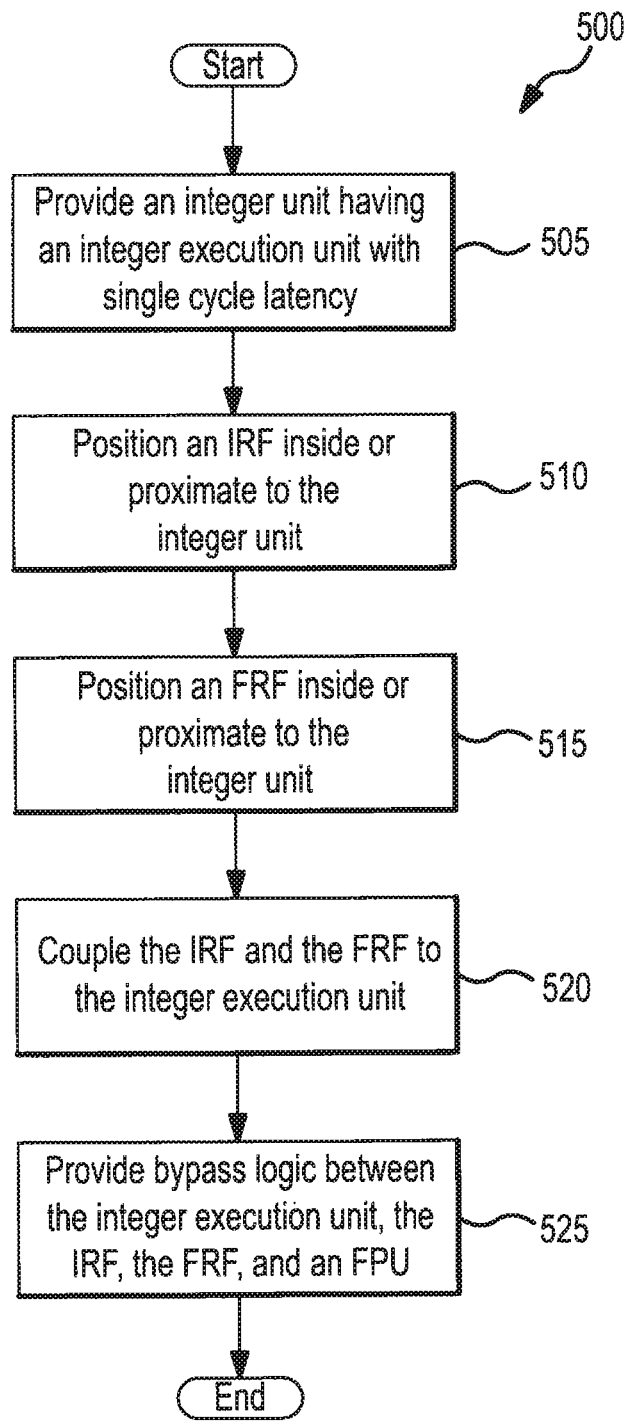
FIG. 5 is a flow diagram illustrating a method for providing a processor core that is operative to move data between an integer register file and a floating-point register file with single cycle latency.

FIG. 5 illustrates a flow diagram for a method 500 for manufacturing a core that is operative to move data between an FRF and an IRF with single cycle latency. Initially, the method 500 includes providing an integer unit, such as integer unit 400 shown in FIG. 4, that includes one or more execution units, such as execution units 235,240 shown in FIG. 4, that are configured to execute instructions with single cycle latency (step 505). The method 500 also includes physically implementing an IRF and an FRF within or proximate to the integer unit (steps 510, 515), and coupling them to the one or more execution units via data buses (step 520). The method further includes providing bypass logic between the one or more integer execution units, an FPU, and the IRF and FRF such that results data may be bypassed (or forwarded) to the FPU or integer execution units, and the data is immediately available for use by other instructions (step 525). In this regard, data may be moved between the IRF and the FRF using the single cycle latency features provided by the one or more integer execution units.

Figure 6:
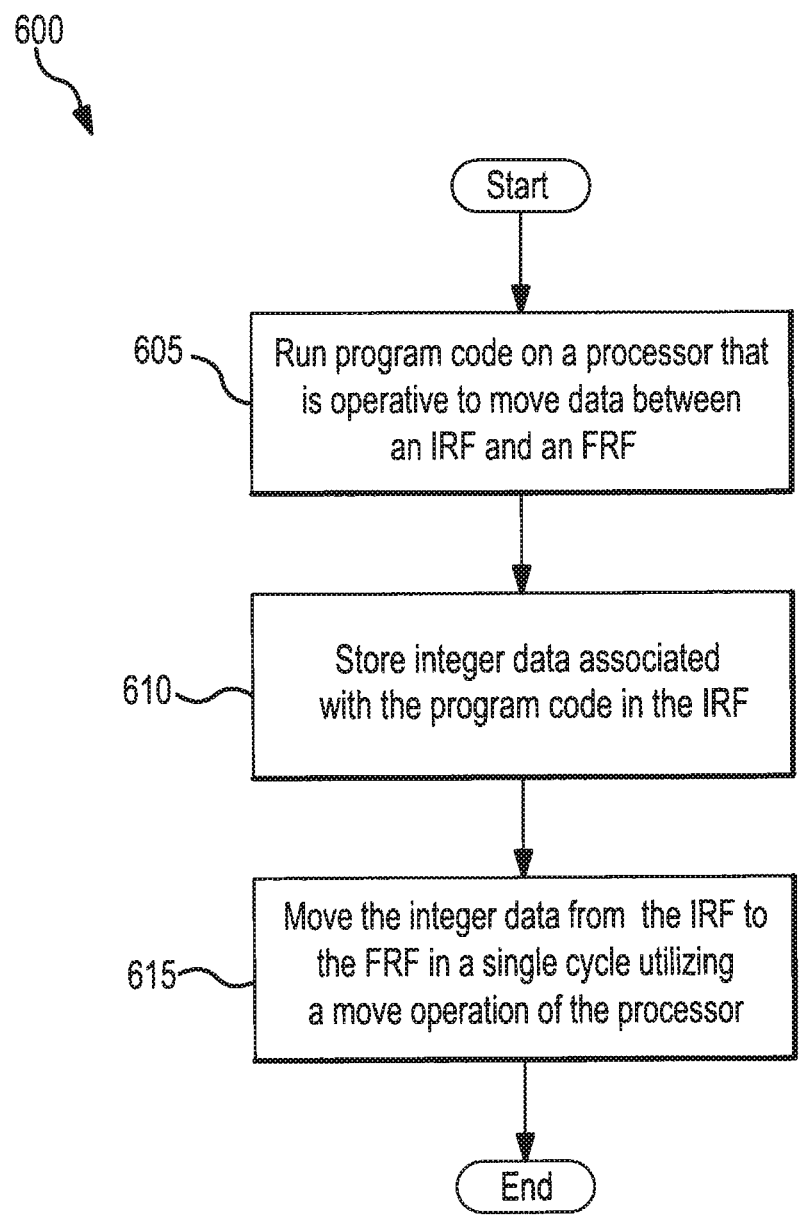
FIG. 6 is a flow diagram illustrating a method for moving data between an integer register file and a floating-point register file with single cycle latency.

FIG. 6 illustrates a flow diagram for a method 600 for moving data between an IRF and an FRF. The method includes running program code on a processor that is operative to move data between an IRF and an FRF (step 605). For example, the processor may be configured to include integer unit 400 shown in FIG. 4. The method 600 also includes storing integer data associated with the program code in the IRF of the processor (step 610), and moving the integer data from the IRF to the FRF in a single cycle utilizing a move instruction of the processor (step 615). As noted above, the program code may utilize the abilities of the processor to store floating-point data in the IRF and/or to store integer data in the FRF. In this regard, the developer of the program code has the flexibility of utilizing any suitable combination of registers of the FRF and the IRF to execute the program code, without increasing the execution time as would be required if loads and stores to memory were required to move data between the IRF and the FRF. As noted above, the ISA utilized with the processor may include specific instructions to perform the single cycle moves between the FRF and the IRF.

Figure 7:
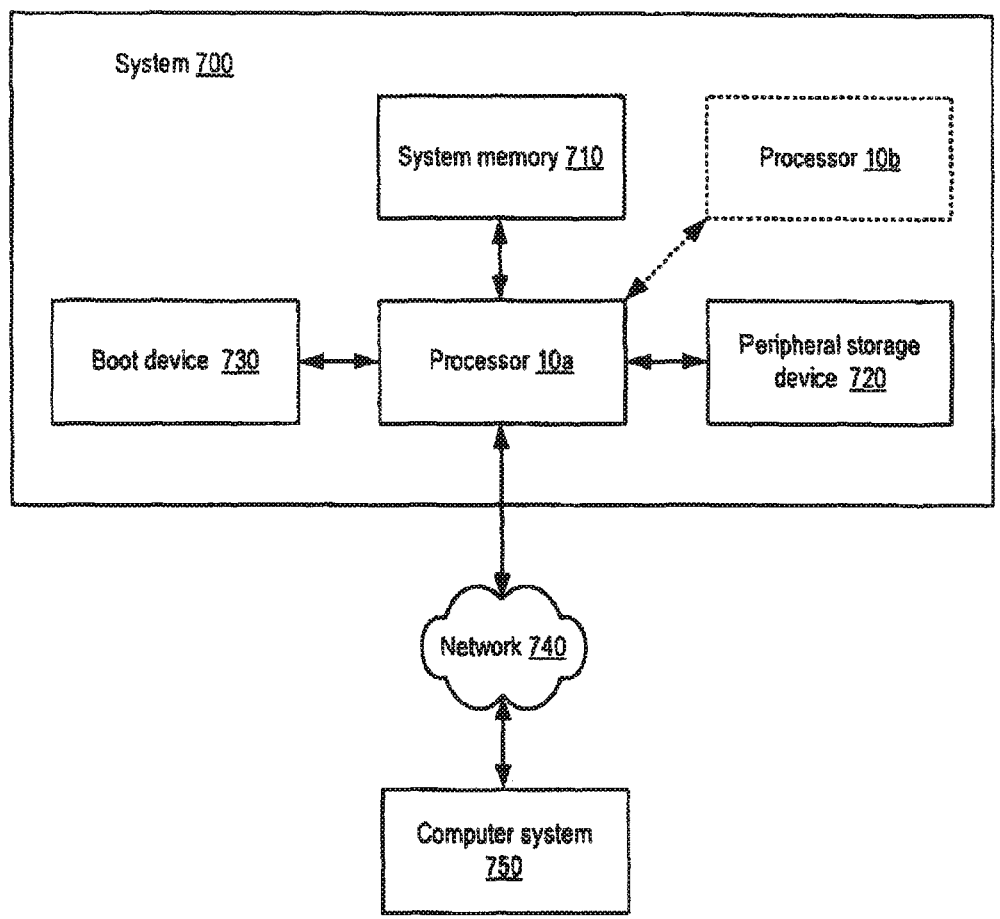
FIG. 7 is a block diagram illustrating one embodiment of a system including a multithreaded processor.

As described above, in some embodiments processor 10 of FIG. 1 may be configured to interface with a number of external devices. One exemplary embodiment of a system including processor 10 is illustrated in FIG. 7. In the illustrated embodiment, system 700 includes an instance of processor 10 coupled to a system memory 710, a peripheral storage device 720 and a boot device 730. System 700 is coupled to a network 740, which is in turn coupled to another computer system 750. In some embodiments, system 700 may include more than one instance of the devices shown, such as more than one processor 10, for example. In various embodiments, system 700 may be configured as a rack-mountable server system, a standalone system, or in any other suitable form factor. In some embodiments, system 700 may be configured as a client system rather than a server system.

In various embodiments, system memory 710 may comprise any suitable type of system memory as described above, such as FB-DIMM, DDR/DDR2 SDRAM, or RDRAM, for example. System memory 710 may include multiple discrete banks of memory controlled by discrete memory interfaces in embodiments of processor 10 configured to provide multiple memory interfaces 130. Also, in some embodiments system memory 710 may include multiple different types of memory.

Peripheral storage device 720, in various embodiments, may include support for magnetic, optical, or solid-state storage media such as hard drives, optical disks, nonvolatile RAM devices, etc. In some embodiments, peripheral storage device 720 may include more complex storage devices such as disk arrays or storage area networks (SANs), which may be coupled to processor 10 via a standard Small Computer System Interface (SCSI), a Fibre Channel interface, a Firewire (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 730 may include a device such as an FPGA or ASIC configured to coordinate initialization and boot of processor 10, such as from a power-on reset state. Additionally, in some embodiments boot device 730 may include a secondary computer system configured to allow access to administrative functions such as debug or test modes of processor 10.

Network 740 may include any suitable devices, media and/or protocol for interconnecting computer systems, such as wired or wireless Ethernet, for example. In various embodiments, network 740 may include local area networks (LANs), wide area networks (WANs), telecommunication networks, or other suitable types of networks. In some embodiments, computer system 750 may be similar to or identical in configuration to illustrated system 700, whereas in other embodiments, computer system 750 may be substantially differently configured. For example, computer system 750 may be a server system, a processor-based client system, a stateless "thin" client system, a mobile device, etc.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected

We claim:

1. A processor comprising:
    an integer unit comprising:
        an integer execution unit that is operative to execute an instruction with single cycle latency;
        an integer register file (IRF) coupled to the integer execution unit; and
        a floating-point register file (FRF) coupled to the integer execution unit;
    a floating-point execution unit that is operative to execute one or more types of instructions with multiple cycle latency; and
    a data bus that couples the floating-point execution unit to the integer unit;
    wherein the integer unit is operative to execute respective move instructions to move data from a register of the IRF to a register of the FRF and to move data from a register of the FRF to a register of the IRF with single cycle latencies using the integer execution unit.

2. The processor of claim 1, wherein the IRF and FRF are implemented physically near the integer execution unit such that the integer execution unit executes instructions having one or more operands located in the IRF or the FRF with single cycle latency.

3. The processor of claim 1, further comprising:
    bypass logic that is operative to identify data dependencies and to forward results data from the integer execution unit or the floating-point execution unit to an input of the integer execution unit or the floating-point execution unit to reduce the instruction latency of either the integer execution unit or the floating-point execution unit.

4. The processor of claim 1, wherein the integer execution unit is a first integer execution unit, and wherein the processor further comprises:
    a second integer execution unit inside the integer unit, the second integer execution unit being operative to execute one or more types of instructions with single cycle latency;
    wherein the second integer execution unit is coupled to the IRF and the FRF, and wherein the integer unit is operative to move data between a register of the IRF and a register of the FRF with single cycle latency using the second integer execution unit.

5. The processor of claim 4, wherein the processor is operative to fetch and execute multiple instructions in parallel, and wherein the processor is further operative to execute instructions in an order different than the order provided by program code that is executed on the processor.

6. The processor of claim 1, further comprising:
    a working register file (WRF) inside the integer unit, the WRF being operative to store results data that have not been committed to architectural state.

7. The processor of claim 6, further comprising:
    bypass logic that is operative to identify data dependencies and to forward results data from the integer execution unit, the floating-point execution unit, or the WRF to an input of the integer execution unit or the floating-point execution unit to reduce the instruction latency of either the integer execution unit or the floating-point execution unit.

8. The processor of claim 6, wherein the WRF, IRF, and FRF are implemented physically near the integer execution unit such that the integer execution unit executes instructions having one or more operands located in the WRF, IRF, or the FRF with single cycle latency.

9. A method of fabricating a core adapted for providing functionality to move data between register files in a processor, the method comprising:
    providing an integer unit including an integer execution unit thereinside that is operative to execute one or more types of instructions with single cycle latency;
    coupling a floating-point execution unit to the integer unit with a data bus;
    positioning an integer register file (IRF) proximate to the integer execution unit inside the integer unit; and
    positioning a floating-point register file (FRF) proximate to the integer execution unit inside the integer unit, and wherein the integer execution unit is operable to move data from a register of the IRF to a register of the FRF and move data from a register of the FRF to a register of the IRF with single cycle latencies.

10. The method of claim 9, further comprising:
    coupling the IRF and FRF to the integer execution unit through data buses.

11. The method of claim 9, further comprising:
    interconnecting a bypass controller to at least one of the integer execution unit and the floating-point execution unit, wherein the bypass controller is operable to identify data dependencies and forward results data from the integer execution unit or the floating-point execution unit to an input of the integer execution unit or the floating-point execution unit.

12. The method of claim 9, wherein the integer execution unit is a first integer execution unit, and wherein the method further comprises:
    providing a second integer execution unit inside the integer unit; and
    coupling the IRF and the FRF to the second integer execution unit through data buses, wherein the second integer execution unit is operable to move data between a register of the IRF and a register of the FRF with single cycle latency.

13. The method of claim 9, further comprising:
    coupling a working register file (WRF) to the integer execution unit and the floating-point execution unit, wherein the WRF is located inside the integer unit, and wherein the WRF is operable to store results data from the integer execution unit or the floating-point execution unit that have not been committed to architectural state.

14. The method of claim 13, wherein the WRF, IRF, and FRF are implemented physically near the integer execution unit such that the integer execution unit executes instructions having one or more operands located in the WRF, IRF, or the FRF with single cycle latency.

15. A computer implemented method for moving data between register files of a processor, the processor comprising an integer unit including an integer execution unit inside the integer unit that is operative to execute one or more types of instructions with single cycle latency, an integer register file (IRF) coupled to the integer execution unit inside the integer unit, a floating-point register file (FRF) coupled to the integer execution unit inside the integer unit, and a working register file (WRF) coupled to the integer execution unit inside the integer unit; a floating-point execution unit that is operative to execute one or more types of instructions with multiple cycle latency; and a data bus that couples the floating-point execution unit to the integer unit, the method comprising:

receiving data from one of the IRF or FRF at the integer execution unit; and executing a move instruction from the integer execution unit to move the data to the other of the IRF or FRF, the executing comprising:

writing the data to a register of the WRF; and writing the data from the register of the WRF to a register of the other of the IRF or FRF, wherein the data is moved from the one of the IRF or FRF to the other of the IRF or FRF using the integer execution unit with single cycle latency.

16. The computer implemented method of claim 15, further comprising:

storing floating-point data in the IRF or storing integer data in the FRF by executing program code on the processor.

17. The computer implemented method of claim 15, further comprising:

running a program that includes floating-point instructions on the processor; and storing floating-point data in the IRF to increase the number of registers available for executing the floating-point instructions.

18. The computer implemented method of claim 15, further comprising:

running a program that includes integer instructions on the processor; and storing integer data in the FRF to increase the number of registers available for executing the integer instructions.

19. The computer implemented method of claim 17, wherein the running comprises:

passing the floating-point instructions through the integer execution unit to the floating-point execution unit; and executing the floating-point instructions from the floating-point execution unit.

20. The method of claim 9, wherein the floating-point execution unit is operative to execute one or more types of instructions with multiple cycle latency.

* * * * *